(12) United States Patent
Foss

(10) Patent No.: X7194
(45) Date of Patent: Aug. 4, 1832

(54) WATER WHEEL, INCLINED

(76) Inventor: Cotton Foss

Cotton Foss
Letters Patent.

The Schedule referred to in these Letters Patent and making part of the same, containing a description in the words of the said Cotton Foss himself of his improvement in the inclined water wheel The chief improvements in this water wheel consists, Firstly an incli-
ned Shaft 12 feet in length 2 feet in diameter where the arms -
pass through. tapered at one end down to 20 inches. This shaft has
sixteen mortises. five feet from the large end of the shaft which
are six inches by two and a half. one foot from the mortises tow-
ards the tapered end, the shaft is made is turned or made round
for the space of one foot. The round part of the shaft is covered
with rolled Iron and made fast to the same. A gudgeon or piv-
ot is made fast to the tapered end of said Shaft. Said arms
are 20 feet in length and four inches thick. and six inches wide.
said arms are made fast in said mortises. To the other ends
of said arms is attached floats or buckets made fast with bolts.
the said buckets are twenty inches in width, and two inches
in thickness, being 8 feet long. The bucket is a little dishing
on the side which the current meets - the buckets are made -
flat on both sides. where it is applied in the tide or where the
current operates both ways. Braces 10 feet in length and three
inches in diameter are made fast to the top of the shaft and
arms by bolts. said braces are covered with canvass or other
wise which forms a roof - A Cog or bevel wheel 12 feet in
diameter to be placed in said shaft twenty inches below the part
made round - Secondly a frame made of good substantial tim-
ber 15 feet square made of timber 12 inches in diameter. in
the bottom of said frame is placed a horizontal moveable sill -
with tenons passing thro' mortises in permanent sills. with a
countersink in said sill to receive a box for the reception of the pivot or gudgeon of said shaft. The height of s^d^ frame is six feet. two plates are placed on top of six posts. in one end of these plates are mortises three feet long and two inches wide - A beam 15 feet long and two feet ten inches in diameter, with tenons at each end, to be placed in the mortises of ^the^ said plates. said beam is circled out in the centre one foot deep and 18 inches in length. friction wheels are placed in said circle for shaft to rest against, a strap of iron passing round said shaft. and made fast to the beam - the said strap half an inch in thickness and two inches in width - The two middle posts of said frame has two inch mortises extending down from the top of said posts three feet. A beam 15 feet long one foot in diameter with tenons at each end to move in said mortises - in the centre of said beam is placed a box to receive a two inch and a half gudgeon from this beam will extend a shaft 12 inches in diameter and of any convenient length to be connected with any necessary machinery. It also has a step joint with a spur or bevel wheel on said [illegible] two feet in diameter to be connected with the cog or bevel wheel before mentioned Thirdly, of the operation. The frame being placed on some solid foundation near to the water. If necessary conductors of timber or otherwise may be anchored or secured so as to conduct ^the^ water to the wheel. The water wheel is governed to any inclination necessary by the movement of the sill on which it stands and the beam against which it rests and ^are^ there secured by pins or otherwise. the said sill and beam are moved by lever power or otherwise.
Rollers may be placed under said sill if necessary. The water wheel together with the frame may be placed on a float and anchored in the current. when the wheel is operated upon by the tide on a float or otherwise there is a perpendicular shaft having two cog wheels of any necessary diameter for the purpose intended being placed on said shaft four feet and a half apart. the lower wheel is connected with the wheel on the horizontal shaft. When a contrary motion is given by the tide said wheel is raised so as to disconnect it from the lower wheel and connect it with the upper wheel.

by this means it keeps the perpendicular shaft in its regular motion. to it may be applied any machinery. in some cases it may be necessary for convenience to place this perpendicular shaft in a horizontal position What I particularly claim as my invention or improvement is the inclined water wheel as herein described. also the moveable sill on which it stands and the sliding beam which is moveable in the said plates, having friction Rollers against which the shaft revolves so that it may be applied to any machinery. the whole or any part of the above described machine, may be multiplied or diminished and made of any sufficient materials, as the nature of the case may require, for it is the principle I claim and not the materials or the size — In testimony that the above is a true specification of my said improvement as above described I have hereto set my hand the first day of June in the year of our Lord, one thousand eight hundred and thirty two Witnesses
Benjamin Crofoot
Wm Graham Colton Fish

1410

(1027)

( Patented 11 August 1832 )

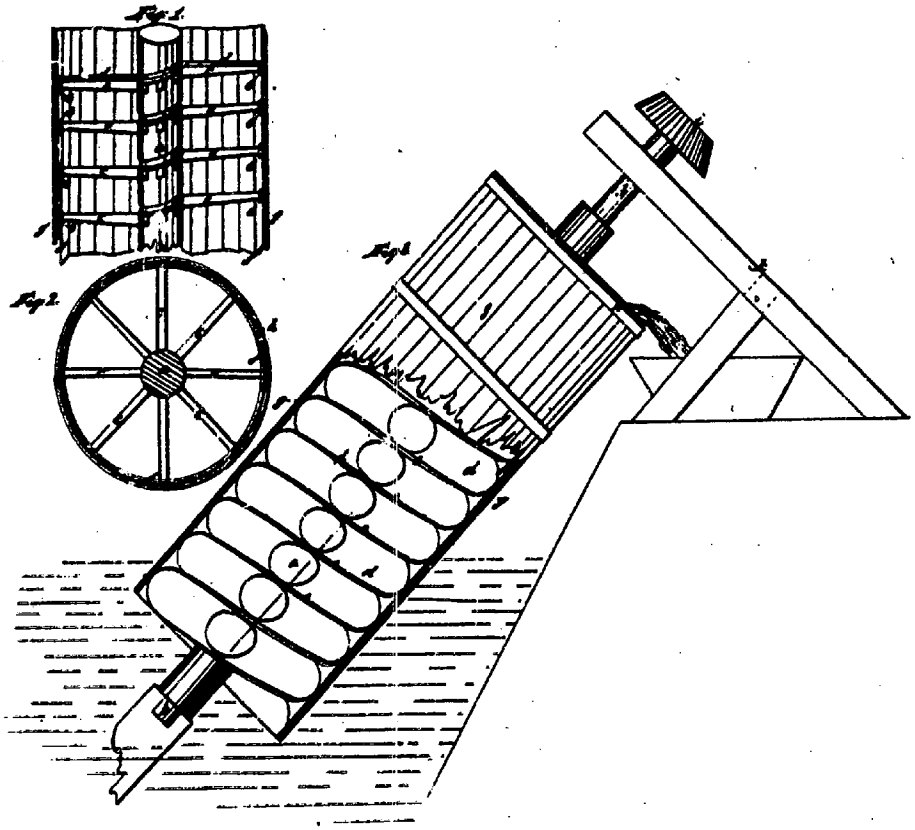

United States Patent
Patent No.: X7194
NO PRINTED SPECIFICATIONS AVAILABLE
C. Foss,
Centrifugal Pump,
Patented Aug. 1, 1832.